United States Patent
Kitchens

[15] 3,658,211
[45] Apr. 25, 1972

[54] FERTILIZER DISTRIBUTOR TANK
[72] Inventor: John T. Kitchens, Americus, Ga.
[73] Assignee: W. M. Kitchens, Americus, Ga. a part interest
[22] Filed: June 16, 1970
[21] Appl. No.: 46,757

[52] U.S. Cl............................222/185, 52/194, 105/248, 222/486
[51] Int. Cl..............................................B67d 5/06
[58] Field of Search...............52/192, 194, 197; 105/248, 105/249, 283; 222/177, 185, 481, 478, 486, 505, 506, 545, 546, 173, 174; 220/1 B

[56] References Cited

UNITED STATES PATENTS

| | | | |
|---|---|---|---|
| 1,775,656 | 9/1930 | Riff | 52/197 X |
| 2,776,786 | 1/1957 | Pankratz | 222/486 |
| 1,760,094 | 5/1930 | Tolman | 52/197 X |
| 1,783,003 | 11/1930 | Skaer | 52/197 |
| 2,258,842 | 10/1941 | Brockett | 222/486 X |
| 1,553,841 | 9/1925 | Thomas | 105/248 |
| 1,422,133 | 7/1922 | Robider | 105/248 |

Primary Examiner—Robert B. Reeves
Assistant Examiner—Larry Martin
Attorney—Clarence A. O'Brien and Harvey B. Jacobson

[57] ABSTRACT

A storage and dispensing tank for granular material including upper and lower portions. The lower portion of the tank includes a first pair of opposite side wall portions which are downwardly convergent to a central elongated bottom wall structure extending between and along the lower edges of the side wall portions. The lower portion also includes a second pair of opposite front and rear walls extending between and connecting the side wall portions. The front and rear walls are only slightly downwardly convergent and the bottom wall structure includes a plurality of longitudinally spaced valved gravity discharge openings. Also, an upright partition extends between and is secured to the side wall portions between each pair of adjacent gravity discharge openings and the lower end of each partition includes inclined baffles extending to the adjacent ends of the adjacent discharge openings.

5 Claims, 5 Drawing Figures

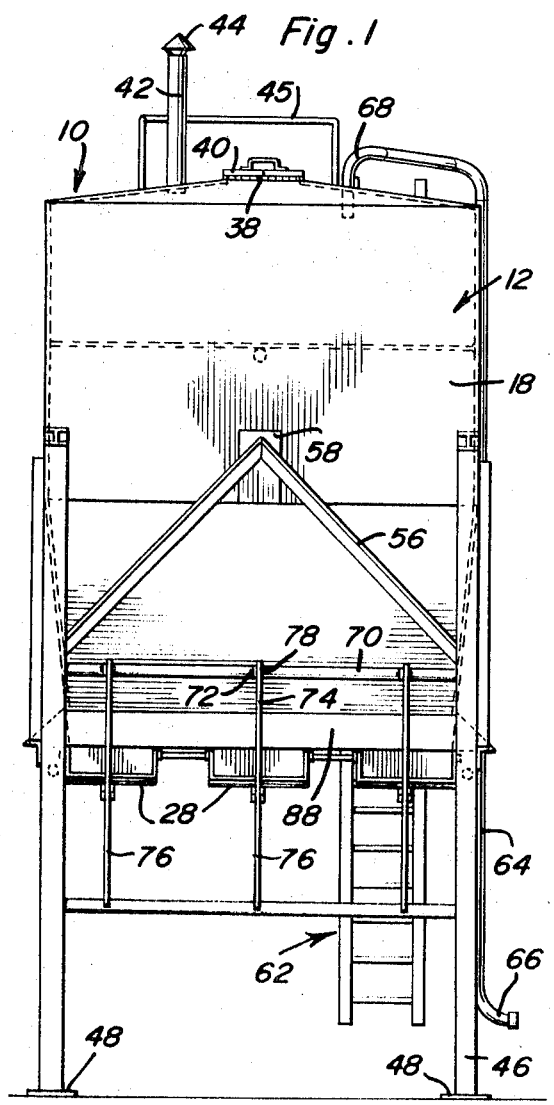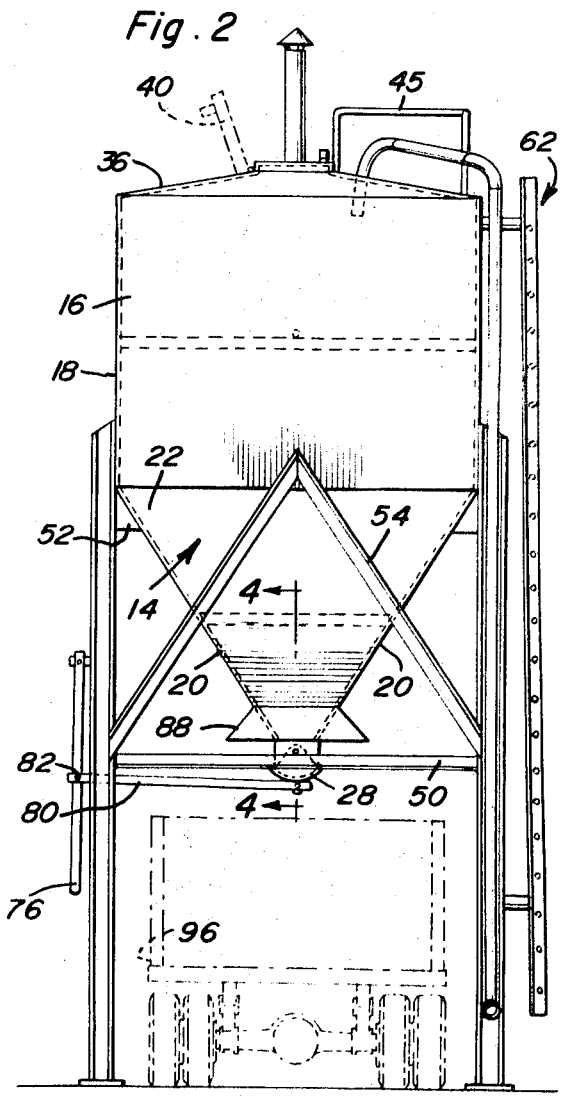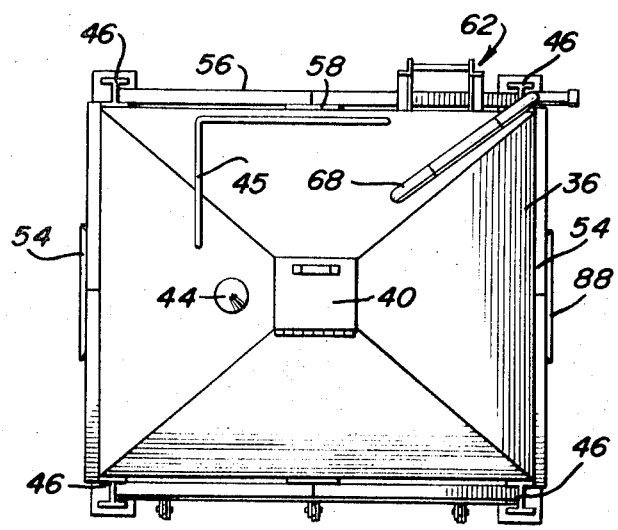

John T. Kitchens
INVENTOR.

FERTILIZER DISTRIBUTOR TANK

The granular material tank of the instant invention is designed so as to be constructed to be of a large capacity. Its capacity will be several times the capacity of the hopper of a granular fertilizer spreader and the load box of a fertilizer truck. The tank is further designed to be supported in elevated position above the ground from four corner posts with the bottom of the tank disposed at an elevation enabling a fertilizer truck or spreader load body to be positioned thereunder for gravity discharge of granular or pelletized fertilizer from the tank into the fertilizer spreader or truck load bed.

The tank includes downwardly convergent opposite side wall portions between which an elongated bottom wall structure extends and the bottom wall structure is provided with a plurality of longitudinally spaced valved gravity discharge outlet openings. Still further, the interior of the tank is provided with baffles extending and secured between the downwardly convergent side wall portions of the tank between each pair of adjacent gravity discharge outlet openings and the lower ends of the baffles or partitions include inclined baffles extending toward the adjacent ends of the adjacent outlet openings.

The bottom wall structure of the tank includes three longitudinally spaced gravity discharge outlet openings whereby the load bed of a fertilizer truck or distributor may be positioned lengthwise beneath the bottom wall structure of the tank and have longitudinally spaced compartments of the load bed simultaneously filled with granular or pelletized fertilizer.

The main object of this invention is to provide an elevated fertilizer tank beneath which fertilizer trucks and spreaders may be positioned for ready gravity discharge of pelletized or granular fertilizer into the load bed of such fertilizer trucks or spreaders.

Another object of this invention is to provide a tank construction specifically designed to be supported in an elevated position above the ground and including internal partition and bracing members.

A still further object of this invention is to provide an elevated fertilizer tank constructed in a manner whereby longitudinally spaced individual compartments of a fertilizer distributor may be simultaneously filled from the tank.

A final object of this invention to be specifically enumerated herein is to provide a fertilizer tank in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the tank of the instant invention;

FIG. 2 is a front elevational view of the tank with an open position of the upper hatch thereof illustrated in phantom lines and a fertilizer truck disposed beneath the truck illustrated in phantom lines;

FIG. 3 is a top plan view of the fertilizer tank;

Figure 4:
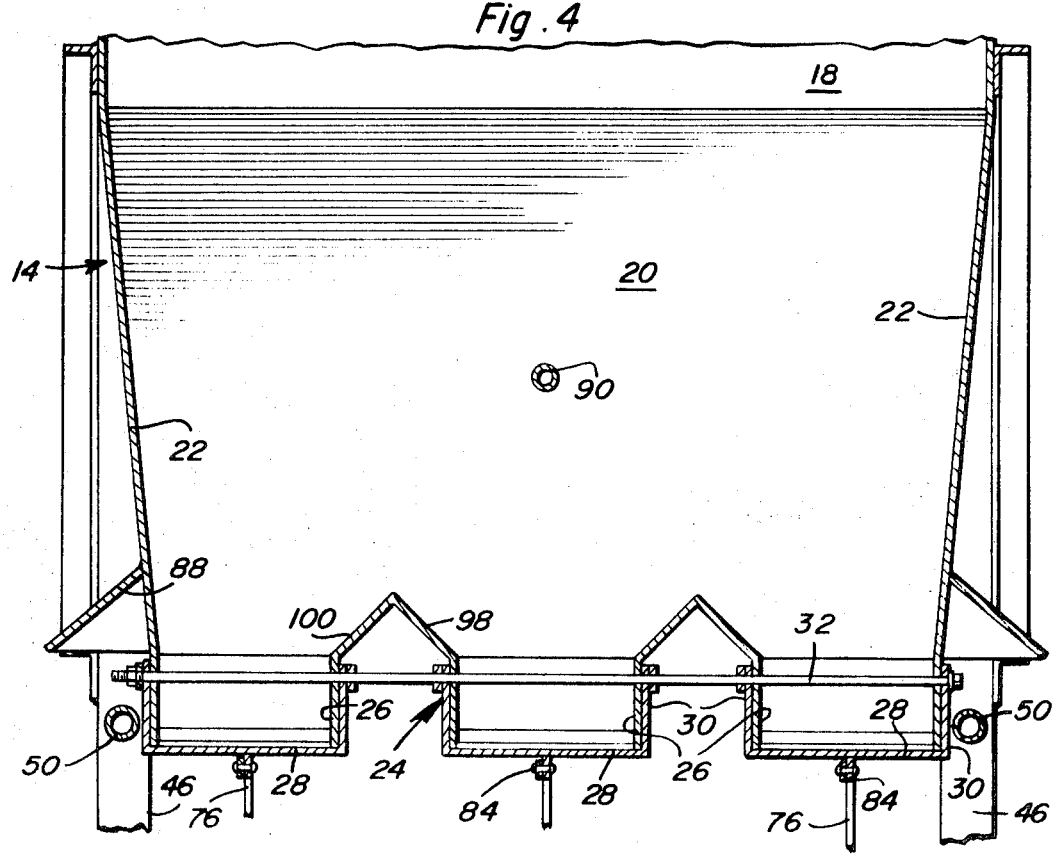
FIG. 4 is an enlarged fragmentary vertical sectional view taken substantially upon the plane indicated by the section line 4—4 of FIG. 2.

Referring now more specifically to the drawings, the numeral 10 generally designates the fertilizer distributor tank of the instant invention. The tank 10 includes upper and lower portions referred to in general by the reference numerals 12 and 14 and it may be seen that the upper portion includes a pair of opposite generally parallel front and rear panels 16 between corresponding edge portions of which a pair of opposite side panels 18 are secured. The panels 16 and 18 are substantially vertically disposed and enclose a generally rectangular area.

The lower portion 14 includes a pair of downwardly convergent opposite side wall portions 20 interconnected, along corresponding marginal edge portions, by means of a pair of slightly downwardly convergent front and rear walls 22.

An elongated longitudinally extending bottom wall assembly 24 extends between the lower ends of the side wall portions 20 and the front and rear walls 22 and includes a plurality of depending outlet neck portions 26 whose lower edge portions are disposed in and conform to an upwardly opening partial cylindrical path extending longitudinally of the bottom wall assembly 24. A plurality of partial cylindrical gate valve members 28 including upstanding sector-shaped end walls 30 are oscillatably supported from the outlet neck portions 26 by means of a single pivot shaft 32 secured through the neck portions 26 and the upper ends of each pair of ends walls 30.

If a larger tank 10 is desired, the length of the tank may be extended and a fourth outlet neck portion 26 may be provided with attedant gate valve structure. However, if the tank is lengthened, a single partition wall is secured transversely in the tank between the side wall portions 20 thereof and with the lower end of the partition (not shown) secured to the joined upper marginal edge portions of the central baffle portions 98 and 100, to be hereinafter more fully described, disposed between the center pair of outlet neck portions 26.

A sloping roof structure referred to in general by the reference numeral 36 is provided and includes a central access opening defining inlet 38 closed by means of a hinged cover 40. The roof structure 36 is secured over the upper end of the upper portion 12 and further includes a vent tube 42 which projects upwardly through the roof structure 36 and is provided with a rain cap 44 on its upper end. A railing structure 45 is supported by the roof structure 36 and it will be noted that all portions of the roof structure 36 slope downwardly toward the outer peripheral portions thereof.

The tank 10 is supported between the upper ends of four corner I beam standards 46 whose lower ends are secured in any convenient manner to suitable concrete footings 48. A pair of transverse pipes 50 extend and are secured between the front and rear pairs of opposite side standards 46 and the upper end of each standard 46 is secured to the corresponding side panel 18 and braced relative to the corresponding side wall portion 20 by means of gusset plates 52. Further, a pair of inverted V-shaped braces 54 are secured at their lower ends to the standards 46 above the opposite ends of the transverse pipes 48 and at their apices to the central lower marginal edge portions of the front and rear panels 16. Also, a second pair of inverted V-shaped braces 56 are secured at their lower ends to the confronting sides of the front and rear standards 46 and at their apices to mounting plate portions 58 secured to the central lower marginal edge portions of the side panels 18. Of course, the upper marginal edge portions of the side wall panels 20 are secured to the lower marginal edge portions of the side panels 18 and the upper marginal edge portions of the front and rear walls 22 are secured to the lower marginal edge portions of the front and rear panels 16.

A vertical ladder assembly 62 is supported from the tank 10 and extends along one vertical side of the tank 10 adjacent the front wall thereof. In addition, a fill tube 64 extends along and is supported from the I beam standard 46 adjacent the ladder 62 and includes a horizontally directed lower inlet end 66 and a horizontally inwardly displaced and downwardly directed upper outlet end 68 which opens downwardly through the roof structure 36.

A horizontal support bracket 70 extends between one pair of front and rear uprights or standards 46 and includes three horizontally outwardly projecting support arms 72 to whose outer ends the upper ends 74 of a pair of levers 76 are pivotally secured by means of fasteners 78. Three connecting levers 80 are provided and have one pair or set of corresponding ends thereof pivotally secured to the levers 76 as at 82 and the other ends thereof pivotally secured to depending mounting lug portions 84 carried by the gate valve members 28. Accordingly, the levers 76 may be oscillated to shift the gate valve members 28 between their open and closed positions.

Figure 5:
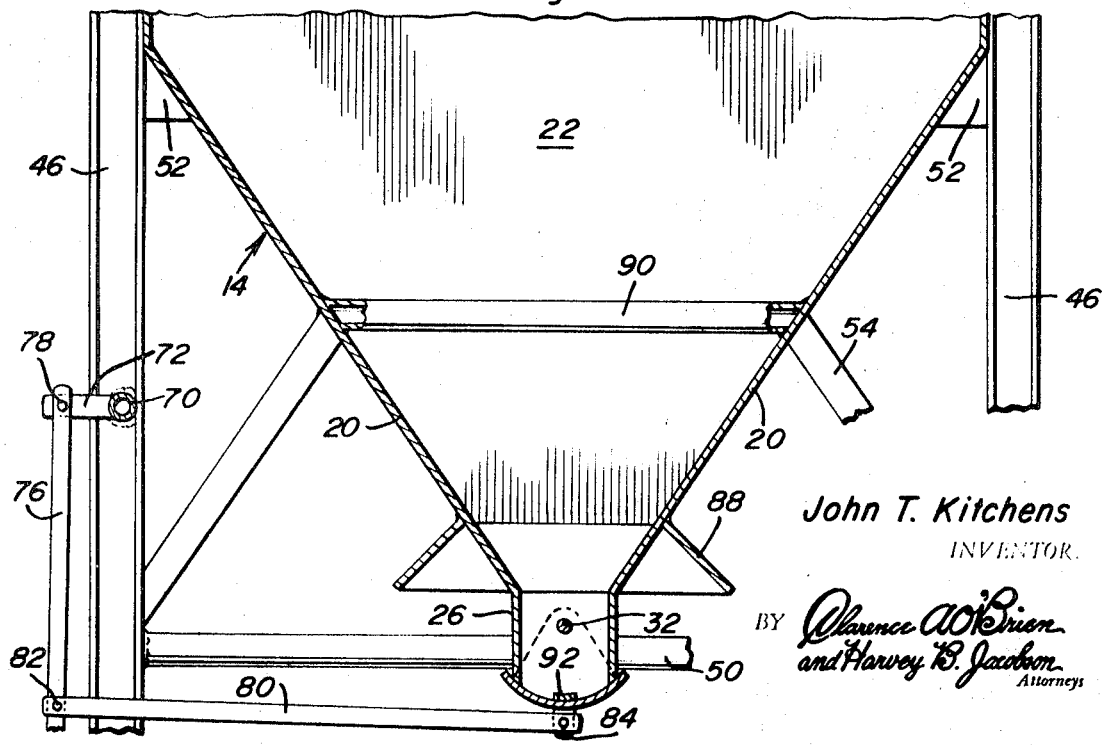
FIG. 5 is a vertical sectional view taken substantially upon a plane passing through the center of FIG. 4 and as seen from the left side of FIG. 4.

With attention now invited more specifically to FIGS. 4 and 5 of the drawings, it may be noted that the front and rear walls 22 are slightly inwardly inclined so as to be downwardly convergent, at least to some degree. A rain shield 88 extends about the lower periphery of the lower portion 14 of the tank 10 and protects the gate valve members 28 from contact with rain and/or snow and the like. Further, it may be seen from FIG. 5 of the drawings that a tubular brace 90 is secured between the vertical mid-portions of the side wall panels 20 and that the inner surface of each gate valve member 28 includes an abutment 92 engageable with opposite sides of the corresponding outlet neck portion 26 so as to limit oscillation of that gate valve member 28.

In operation, large quantities of fluent granular fertilizer or pelletized fertilizer may be stored within the tank 10. Then, when it is desired to spread the fertilizer, a fertilizer truck or spreader such as that indicated at 96 in FIG. 2 of the drawings may be driven beneath the bottom wall structure or assembly 24 with the outlet neck portions 26 spaced longitudinally of the load bed of the fertilizer truck 96. Then, the gate valve members 28 may be shifted to the open positions so that granular or pelletized fertilizer from within the tank may be discharged by gravity into the fertilizer truck.

The gate valve members 28 may be individually actuated and it may be seen from FIG. 4 of the drawings that the bottom wall assembly 24 includes baffle portions 98 and 100 which converge upwardly toward and are secured to each other at their upper marginal edge portions. Of course, the baffles or baffle portions 98 and 100 serve to insure that all of the gradular or pelletized fertilizer within the tank 10 may be discharged therefrom by gravity through the outlet neck portions 26.

If the longitudinally expanded form of tank including four outlet necks is provided, a central partition will be disposed within and secured between the side wall portions 20 with the lower end of such partition anchored to the upper junction of the center pair of baffle portions 98 and 100. In addition, such an expanded tank would have two actuators for the gate valve members of the four outlet neck portions 26 with one actuator being utilized for each pair of outlet necks, thereby enabling two different types of fertilizers to be disposed within the expanded tank and to be individually dispensed from the lower end thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A storage and dispensing tank for granular material including upper and lower portions, said lower portion including a first pair of downwardly convergent opposite side wall portions spaced apart at their lower ends, an elongated bottom wall structure extending between and along the lower portions of said side wall portions, said bottom wall structure including a plurality of longitudinally spaced gravity discharge outlet openings, valve means operatively associated with said outlet openings for selectively opening and closing the latter, said lower portion including a second pair of opposite front and rear walls extending between said side wall portions and to whose lower ends the opposite ends of said bottom wall structure are secured, said upper portion including substantially vertical opposite side and front and rear panels projecting upwardly from the upper marginal edges of said lower portion, four horizontally spaced apart standards, the lower and upper corner portions of said upper and lower tank portions, respectively, being supported between and from the upper end portions of said standards with said lower portion in elevated position relative to the lower ends of said standards, a generally inverted V-shaped brace secured between each pair of adjacent standards and to said tank, the apices of said braces being attached to the horizontal midportions of the lower marginal edge portions of said opposite side and front and rear panels and the free ends of the legs of said braces being secured to the corresponding standards, and a horizontal elongated brace member extending and secured between adjacent standards of said tank at an elevation at least substantially coinciding with the areas of securement of the free ends of the legs of the corresponding inverted V-shaped brace with the standards.

2. The combination of claim 1 wherein said outlet openings are defined by depending outlet neck portions whose lower ends are defined by lower edge portions disposed in and conforming to an upwardly opening partial cylindrical path, said valve means comprising partial cylindrical gate members oscillatably supported from said outlet neck portions for swinging about their axes of curvature and against whose upper surfaces said lower edge portions conform and seal when said gate members are disposed in vertical registry with the lower ends of said outlet neck portions.

3. The combination of claim 2 including means connecting said gate members together for equal and simultaneous swinging movement relative to said outlet neck portions.

4. The combination of claim 1 wherein said lower portion includes a plurality of upstanding partitions secured between said opposite side wall portions between pairs of adjacent discharge outlet openings.

5. The combination of claim 4 wherein the lower ends of said partitions include inverted V-shaped baffle means extending downwardly and outwardly from the lower marginal edge portions of said partitions toward the adjacent discharge outlet openings.

* * * * *